March 2, 1937. E. E. BUTTERFIELD 2,072,154
CYCLIC PROCESS OF SEWAGE TREATMENT AND SLUDGE DISPOSAL
Filed Sept. 6, 1930
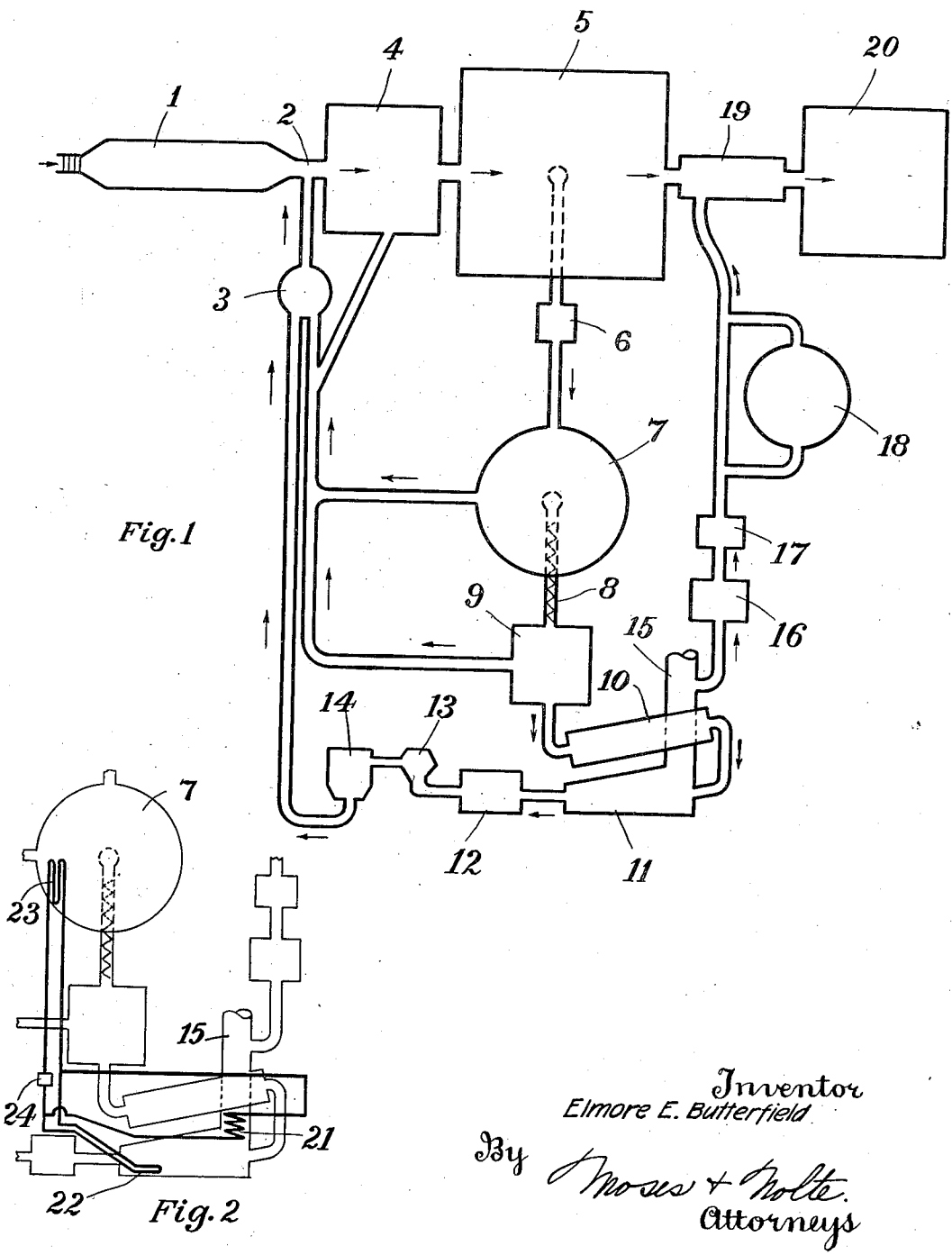
Inventor
Elmore E. Butterfield
By Moses + Nolte
Attorneys Patented Mar. 2, 1937

2,072,154

UNITED STATES PATENT OFFICE 2,072,154

CYCLIC PROCESS OF SEWAGE TREATMENT AND SLUDGE DISPOSAL

Elmore E. Butterfield, Forest Hills, N. Y.

Application September 6, 1930, Serial No. 480,145

7 Claims. (Cl. 210—2)

This invention proposes to provide a method of treating sewage, which will bring about a separation of the solids from the liquid portion, disinfection or sterilization of the liquid and inoffensive disposal of the solids and by which part of the chemicals employed therein are reclaimed and returned to the process at the conclusion of the cycle. The main difficulty experienced in the treatment of sewage is the inoffensive disposal of the solid material contained in the sewage. The organic sewage solids are highly putrescible and are readily broken down by bacterial activity or physical agencies, such as heat, into malodorous gases and liquids.

It is proposed, therefore, to introduce lime as hydrate ($Ca(OH)_2$) into the raw sewage after it has passed over coarse screens and through grit chambers, under adjustable control from dosing tanks, in quantities sufficient to form calcium carbonate ($CaCO_3$) by precipitation to approximate the weight of the suspended solids in the sewage influent.

It is further proposed to thoroughly mix the lime with the sewage by mechanical means or by the injection of air, and to direct the flow of the limed sewage into suitable settling tanks in which most of the suspended solids are carried down by gravity with the precipitated calcium carbonate to the bottom of the tanks, where a suitable mechanism continuously moves the accumulating sludge into the suction of a suitable sump pump which conveys it to secondary settling tanks or thickeners.

It is further proposed to return the excess liquid effluent from the secondary settling tanks or thickeners either into the lime dosing tank or into the mixing and aerating tanks to be further described herein.

It is further proposed to pump the sludge or slurry from the thickeners into a suitable vacuum or other type of filter and to return the liquid effluent therefrom into the dosing tank or into the mixing and aerating tanks.

It is further proposed to convey the filter cake consisting of partially dewatered sewage solids and calcium carbonate into a rotary or other type of drier for the purpose of removing most of the water.

It is further proposed to deliver the dry or partially dried sewage solids and calcium carbonate from the drier into a suitable furnace where the organic sewage solids are burned completely and calcium carbonate is calcined by heat.

It is further proposed to recover the carbon dioxide contained in the furnace gases by means of a sodium carbonate or other known recovery process and to utilize the recovered carbon dioxide for recarbonation of the effluent from the settling tanks in order to restore the carbonic acid content of the sewage, which has been reduced by aeration and the precipitation of calcium carbonate.

It is further proposed to hydrate the solid products of combustion consisting chiefly of calcium oxide, silica, alumina and iron oxides, and to separate the resulting calcium hydrate from the impurities in a suitable separator and to return it into the lime dosing tank, and to reject the perfectly sterile inorganic impurities.

It is further proposed that after recarbonation of the liquid by the carbon dioxide from the furnace to restore its acid reaction, to sterilize or disinfect the liquid by chlorination.

It is further proposed to recover part of the waste heat generated in the furnace and to utilize it to heat the sludge in the thickeners, thereby facilitating and accelerating sedimentation and filtration.

For a fuller understanding of the invention, reference may now be had to the following detailed description taken with the annexed drawing, in which Figure 1 is a diagrammatic view of a flow sheet showing the operation of a preferred embodiment; and Figure 2 shows in greater detail certain heat recovery steps.

In the drawing, 1 is a grit chamber preceded by a bar screen and dimensioned to give the desired rate of flow. 2 is a duct of properly constricted section to increase the velocity of the flow so as to prevent the settling out of the lime carried in suspension and to facilitate the flow from the lime dosing tank 3 by reduced pressure. 4 is an aerating and mixing tank which receives and mixes the limed sewage by means of a paddle mechanism or by compressed air injection and retains the aerated and mixed sewage for a desired period of time. 5 is a settling tank provided with a mechanical means for collecting the settled limed slurry and to deliver it into the suction of a sump pump 6 which discharges the slurry into a concentrate thickener 7 with sufficient storage capacity to hold a several days' supply. The concentrated slurry is conveyed by means of a screw or other type of conveyor 8 into a vacuum or other type of filter 9 from which the cake produced is conveyed into a rotary or other type of drier 10. From the drier 10 the material is delivered into the furnace 11 where it is inoffensively burned by the aid of fuel other than the material itself and the calcium carbonate is calcined by the heat. The solid products of combustion containing crude lime obtained by calcination, silica, alumina, iron oxides and other impurities are delivered into a hydrating plant 12. Separation of the hydrated lime takes place in a separator 13 from which the lime is discharged into the storage tank 14 and the impurities are rejected. From the storage tank 14 the separated lime is returned to the dosing tank 3 as needed. The gaseous products of combustion pass from the furnace 11 around the drier 10 and into the stack 15. The partially cooled gases then enter a sodium carbonate or other known type of carbon-dioxide-recovery process 16 where the carbon dioxide is extracted, and is then cooled and compressed in the compressor 17 after which the carbon dioxide may be stored in cylinders, or in a gasometer 18, or delivered direct into the recarbonation channel 19 where it is mixed with the effluent from the settling tanks 5 for the purpose of restoring the acidity of the effluent before it enters the chlorination tank 20. The liquid effluent separated in the filter 9 and the thickener 7 is returned either to the lime dosing tank 3 or is diverted into the aerating and mixing tanks 4.

The waste heat from the sludge burning furnace 11 may be partially recovered as shown by Figure 2 by means of a waste heat boiler or a water heater 21 in the furnace and by means of steam generating or water heating coils 22 in the ash pit. The waste heat from either or both of the above sources is transferred by means of steam or water heating coils 23 into and within the concentrate thickener 7 to facilitate and accelerate the settlement of the sewage solids and calcium carbonate in the thickeners and to facilitate and accelerate filtration of the thus heated sludge or slurry. 24 indicates a suitable condensate return trap or a receiver and feed pump for returning the condensate into the steam generating coils 22 or to the boiler 21.

While I have illustrated and described in detail one embodiment of the invention, it is to be understood that changes may be made therein. I do not, therefore, desire to limit myself to the specific construction illustrated but intend to cover my invention broadly in whatever form its principles may be utilized.

I claim:

1. The process of handling sewage, which comprises combining sewage constituents with a chemical precipitant, forming a sludge, continuously filtering the sludge, continuously drying the filter cake, calcining the dried filter cake to regenerate the precipitant, passing hot gases from the calcining operation in heat exchange relation with the said filter cake to dry the same, and treating sewage with the regenerated precipitant.

2. The process of handling sewage, which comprises combining sewage constituents with a basic chemical precipitant, forming a sludge, continuously filtering the sludge, continuously drying the filter cake, calcining the dried filter cake to regenerate the basic precipitant, passing hot gases from the calcining operation in heat exchange relation with the said filter cake to dry the same and treating sewage with the generated basic precipitant.

3. The process of handling sewage, which comprises combining sewage constituents with an alkaline earth oxide, forming a sludge, continuously filtering the sludge, continuously drying the filter cake, calcining the dried filter cake to regenerate the alkaline earth oxide, passing hot gases from the calcining operation in heat exchange relation with the said filter cake to dry the same, and treating sewage with the regenerated alkaline earth oxide.

4. The process of handling sewage, which comprises combining sewage constituents with lime, forming a sludge, continuously filtering the sludge, continuously drying the filter cake, calcining the dried filter cake to regenerate the lime, passing hot gases from the calcining operation in heat exchange relation with the said filter cake to dry the same and treating sewage with the regenerated lime.

5. The method of handling sewage sludge which comprises continuously filtering the sludge, continuously drying the filter cake, calcining the dried filter cake and passing hot gases from the calcining operation into counter current heat exchange relation with the said filter cake.

6. The method of handling sewage, which comprises combining sewage constituents with lime forming a sludge and an effluent to be separately treated, the sludge treatment comprising continuously filtering the sludge, continuously drying the filter cake, calcining the dried filter cake to regenerate the lime, passing hot gases from the calcining operation in heat exchange relationship with said filter cake to dry the same and employing the regenerated lime in further sewage handling, and the effluent treatment comprising the extracting from the gases from the calcining operation carbon dioxide, and mixing the carbon dioxide with the effluent to reduce its alkalinity.

7. The method of handling sewage, which comprises combining sewage constituents with lime forming a sludge and an effluent to be separately treated, the sludge treatment comprising continuously filtering the sludge, continuously drying the filter cake, calcining the dried filter cake to regenerate the lime and employing the regenerated lime in further sewage handling, and effluent treatment comprising the extracting from the gases from the calcining operation carbon dioxide, and mixing the carbon dioxide with the effluent to reduce its alkalinity.

ELMORE E. BUTTERFIELD.